United States Patent

[11] 3,556,242

| [72] | Inventor | William R. Dollase<br>Racine, Wis. |
|---|---|---|
| [21] | Appl. No. | 813,014 |
| [22] | Filed | Apr. 3, 1969 |
| [45] | Patented | Jan. 19, 1971 |
| [73] | Assignee | J. I. Case Company<br>Racine, Wis.<br>a corporation of Wisconsin |

[54] HYDRAULIC STEERING SYSTEM
6 Claims, 2 Drawing Figs.

[52] U.S. Cl. .................................................. 180/79.2,
60/52
[51] Int. Cl. .................................................... B62d 5/06
[50] Field of Search ........................................... 180/79.2;
60/525; 114/150

[56] References Cited
UNITED STATES PATENTS

| 2,020,951 | 11/1935 | Lemon | 60/52 |
| 2,334,918 | 11/1943 | French | 180/79.2 |
| 2,918,135 | 12/1959 | Wittren | 180/79.2 |
| 3,016,708 | 1/1962 | Gordon et al. | 60/52 |
| 3,189,119 | 6/1965 | Moreno et al. | 180/79.2 |
| 3,202,238 | 8/1965 | Strader | 180/79.2 |
| 3,508,400 | 4/1970 | Mercier | 60/52 |

*Primary Examiner*—Leo Friaglia
*Assistant Examiner*—Leslie J. Paperner
*Attorney*—Settle, Batchelder and Oltman ABSTRACT: A power steering system including a main pump for supplying pressured main fluid to fluid motors and in which the control valve is actuated by an auxiliary pump which is connected to the steering wheel of a vehicle. The present invention contemplates completely isolating the control valve actuating fluid system from the main fluid control system and connecting the control valve actuating fluid system directly to the fluid motors so that the auxiliary pump can move the fluid motors independently of the pressured main pump system when the pressured main pump fluid system becomes inoperative.

PATENTED JAN 19 1971

3,556,242

INVENTOR.
WILLIAM R. DOLLASE.
BY
SETTLE, BATCHELDER & OLTMAN.
ATT'YS.

3,556,242

HYDRAULIC STEERING SYSTEM

BACKGROUND OF THE INVENTION

The present invention relates generally to fluid pressure systems and more particularly to an improved hydraulic power steering system.

The utilization of hydrostatic steering systems has been very common in most recent years in agricultural vehicles since it allows the steering forces applied by the operator of a vehicle to be transmitted to the steering control system or actuating system without any mechanical linkage or connection between the steering wheel and the actuator.

In recent years, it has become mandatory that any hydrostatic power system, which is controlled by an auxiliary pump that is actuated by the steering wheel of the vehicle, to have the system be capable of being operated solely by the auxiliary pump in case of complete fluid power failures of the main control system.

Various devices have been proposed in which the auxiliary or steering, manually controlled pump is incorporated within the system of the main power pump and control system so that the auxiliary pump may be utilized to actuate the steering mechanism in case of failure of the main system. One type of device is shown in U.S. Pat. No. 2,918,135. A second type of device is disclosed in U.S. Pat. No. 2,334,918 wherein the fluid from the power pump is transmitted through the hand pump and is further pressured by the hand pump before being supplied to the control actuators.

While these particular devices have found some success, it has been found that the devices of the above type have several serious drawbacks. One of the primary drawbacks of systems of the above type is that these systems require a manual hand pump connected to the steering wheel which is of substantially the same size as the power pump so that the fluid being utilized can be sufficiently pressured by the manual pump. Of course, larger type of agricultural vehicles dictate that a large displacement hand pump must be utilized in this type of system so as to allow manual steering in case of power failures.

Another drawback which has been encountered in presently available types of steering systems is that vibration results in the system due to the interaction of the hydraulic elements and more particularly due to the feedback flow which is normally a necessary element of prior art systems.

A further problem encountered in present day systems is that the system oftentimes develops small leaks which results in what is termed "drift" of the wheels independent of the operator's movement of the steering wheel.

SUMMARY OF THE INVENTION

The present invention contemplates an improved power steering control system in which all of the above-mentioned shortcomings of the prior art devices are overcome. The present control system contemplates completely isolating the main pressure hydraulic flow path from the manually controlled flow path so that the manual pump control path may be completely sealed to eliminate any possibility of leakage. Furthermore, the system is arranged and incorporated into conventional fluid actuators so that the manual pump of a given size can be utilized for actuating substantially any size actuators of a power steering system.

More specifically, the present invention is being disclosed as being used in connection with a steering system which incorporates a pair of fluid rams having piston rods slidable in cylinders with the main pressured-fluid source connected to the head ends of the cylinders through a fluid-actuating control valve. The control valve is actuated by a separate fluid control system which is connected to the manually steerable auxiliary pump to the control valve and to the rod ends of the cylinder and is completely isolated from the main fluid supply system.

Thus, the primary object of the present invention is to provide an actuating hydraulic control circuit for a fluid control valve of power steering system which is completely isolated from the main fluid control system utilized for operating the actuators.

Another object of the present invention is to provide an improved power steering control system in which the auxiliary or manual pump of the system is directly connected to the fluid actuators of the steering system so as to be capable of complete manual operation when the main power control system becomes inoperative.

Other objects of this invention will appear in the following description and appended claims, reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and being practiced or carried out in various ways. Also, it is to be understood that the phraseology or terminology employed herein is solely for the purpose of description.

Also, while the present system will be described and illustrated in connection with an actuator for steering wheels of the type which includes hydraulic cylinders, it is readily apparent that the same control system may be incorporated into vane-type actuators as well as rack and pinion piston driven types of actuators and others.

Figure 1:
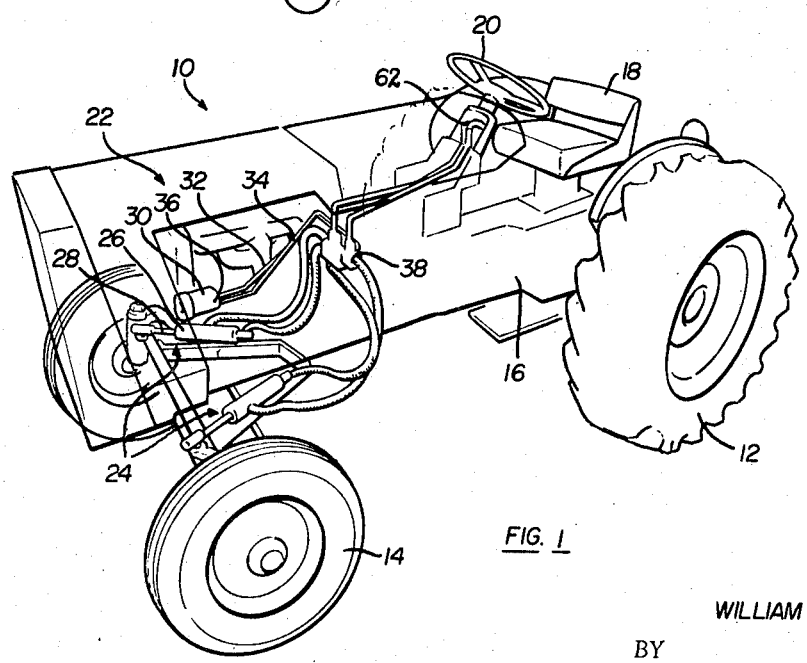
FIG. 1 discloses schematically a perspective view of an agricultural vehicle having the present invention incorporated therein.

FIG. 1 of the drawings schematically illustrates a tractor or vehicle 10 having driving wheels 12 and steering wheels 14 supporting a main body portion 16. The main body portion 16 has an operator's compartment including an operator's seat 18 and a steering wheel 20.

Figure 2:
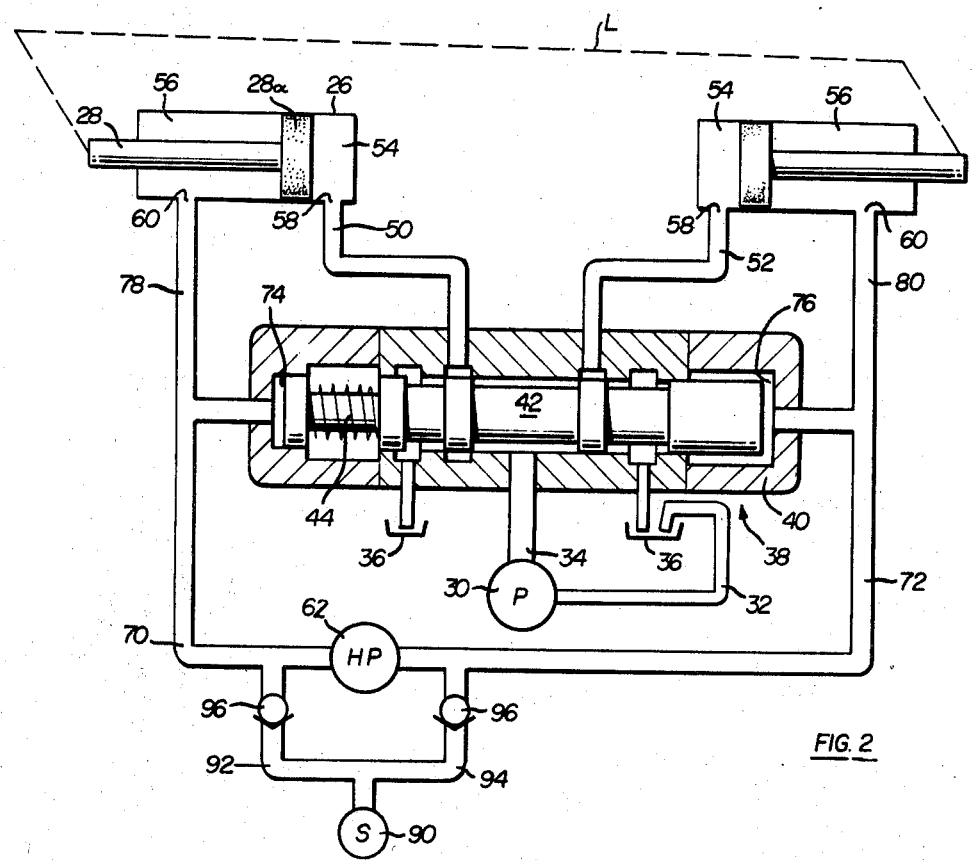
FIG. 2 schematically discloses a fluid control system constructed in accordance with the present invention.

The power steering system 22, schematically illustrated in FIG. 1, includes a pair of fluid motors 24 each comprising a cylinder 26 and a piston rod 28 slidable within the cylinder. The two piston rods 28 operate the mechanical elements of the steering system and are thus mechanically linked to each other as schematically illustrated at L in FIG. 2 so that extension of one rod 28 from its cylinder is mechanically transmitted via linkage L to cause the other rod 28 to retract into its cylinder.

The power steering system 22 further includes a main power-steering pump 30 which is operated by the engine or propulsion system of the tractor 10 and which is connected through conduits 32 and 34 to a reservoir 36 and a control valve 38 respectively. The control valve 38 includes a valve housing 40 and a valve spool 42 slidable in opposite directions to selectively supply pressurized fluid to one end of one of the cylinders 26 through a first conduit 50 while connecting the opposite cylinder to the reservoir through a conduit 52. The valve spool 42 is normally maintained in the neutral position by a conventional type of biasing mechanism 44. Since the valve and the various elements described hereinabove are conventional items and are merely illustrated schematically as environment for the present invention, further details of these elements will not be set forth.

As is conventional in the fluid rams 24, the pistons 28a divide the cylinder 26 into head-end and rod-end chambers 54 and 56 with the chambers respectively having a head-end port 58 and a rod-end port 60. The two head-end ports 58 communicate respectively with conduits 50 and 52, for a purpose which will be described later, while the rod-end ports 60 are operatively connected to a reversible manual-steering pump 62 in accordance with the present invention.

According to the invention, the steering pump 62 has opposite ends connected through conduits 70 and 72 to chambers 74 and 76 which are defined adjacent the opposite ends of the valve spool 42 with the chambers of course being formed within the housing 40. The chambers 74 and 76, and therefore the opposite ends of the steering pump 62 are also connected through conduits 78 and 80 to the rod-end fluid ports 60 of the respective fluid rams 24, for a purpose which will become apparent hereinafter.

The fluid interconnection of the manually controlled steering pump 62 to the chambers 74 and 76 at the ends of control valve 38, as wells the chambers 56 formed on the rod-end sides of the cylinders 26 allows the manually operated control circuit thus defined to be completely isolated from the main pressure system for the power steering control. According to the present invention, the conduits 70, 72, 78 and 80 as well as the chambers 74, 76 and 56 are completely filled with a fluid or liquid which is completely separated from the main pressured-fluid system which includes the main pump 30, and the fluid source of reservoir 36 which supplies pressured fluid to the head-end chambers 54 of the cylinders 26.

According to a further aspect of the present invention, the fluid or liquid which is trapped in the auxiliary system mentioned hereinabove is preferably maintained at a positive or superatmospheric pressure by an auxiliary-pressured-fluid source 90 and conducts 92 and 94 respectively connected to conduits 70 and 72 on opposite sides of the manual steering pump 62. The conduits 92 and 94 preferably have one-way valves or check valves 96 disposed therein and the arrangement allows for automatic compensation for any loss of fluid within the auxiliary or second fluid flow path defined between the manual steering pump 62, the actuating chambers 74 and 76 and the cylinder chambers 56.

OPERATION

The operation of the improved control system is believed apparent from the above description. Thus, actuation of the steering wheel 20 in either direction causes an actuation of the reversible pump 62 so as to transfer fluid between line 70 and line 72. This transfer of fluid causes a pressure increase in either chamber 74 or 76 so as to actuate the valve spool 42 in the appropriate direction from the neutral position. Actuation of the valve spool will cause pressured fluid to either be supplied to conduit 50 or conduit 52 while the other of the two conduits is connected to the reservoir 36. This will cause extension via linkage L of the piston rod 28 of the cylinder which is being supplied with pressured fluid from pump 30, while mechanically causing a retraction of the other piston rod 28 so as to control the steering of the wheels 14. The cylinder in which the rod 28 is being so retracted has its head end connected via valve 38 to sump 36.

During this extension and retraction of the respective piston rods 28, fluid is constantly being transferred from one chamber 56 to the opposite chamber 56, of the respective fluid cylinders 26, by action of the manual hand pump 62.

This transference of fluid by the hand pump 62 causes a buildup of low-level pressure in one conduit which causes the spool to be moved in such a direction as to cause fluid to be ported to the head end of one cylinder and to cause fluid from the head end of another cylinder to be ported to sump. The cylinder which is having its fluid ported to sump is also being moved by virtue of its mechanical connection to linkage L. This mechanically induced movement causes the draining cylinder to move in such a direction that the manual hand pump induced pressure which is built up in its chamber 56 is reduced, because the volume of space in chamber 56 is increasing, as the cylinder moves in a retracting direction.

When this volume of compressed oil is decompressed by reason of its occupancy of an increased volume, the resultant decompression of oil results in a lowered conduit pressure and the spring-bias system 44 centers the spool and no more oil is ported to the head end of the cylinder formerly causing movement of the overall steering mechanism.

This sequence of events illustrates the fact that power oil is ported to a cylinder head end only, while the rod-end chamber is pressurized due to movement of hand wheel 20 and actuation of manual hand pump 62.

It will thus be seen that the present control system allows for a complete isolation of the control circuit connecting the manual pump to the control valve from the main pressured-fluid source. Furthermore, in case of failure of the main pressured-fluid control system, the tractor 10 may still be steered by the manual control pump since it is only necessary to transfer fluid from one of the chambers 56 to the other of the chambers 56 of the respective fluid rams 26. This can be accomplished by a smaller pump than would be necessary if the system were to require replacement of all of the power which is supplied by the main pressured fluid pump 30.

While a specific embodiment has been shown and described, it is readily apparent that various details of the present invention may be modified without departing from the basic spirit of the invention.

I claim:

1. In a hydraulic steering system for a vehicle having a steerable wheel, the combination comprising a pair of chambers, each having an element attached to said steerable wheel, each element being slidable in its chamber to divide each such chamber into first and second compartments, a power pump, a reservoir, a reversible auxiliary pump, and a control valve having a valve spool movable in opposite directions from a neutral position, the improvement of means defining a first fluid flow path through said control valve to selectively supply pressured fluid from said power pump to one of said first chambers while connecting the other of said first chambers to said reservoir, and means defining a second fluid flow path, said second fluid flow path having a fluid therein and operatively connecting said auxiliary pump with said second chambers and with opposite ends of said control valve whereby actuation of said auxiliary pump moves said control valve from the neutral position to move said elements in said chambers.

2. The combination as defined in claim 1, including the further improvement of means maintaining a positive pressure on the fluid in said second flow path.

3. A hydraulic steering system for a vehicle having a steering wheel and at least one steerable wheel including first and second fluid motors operatively connected to said at least one steerable wheel and each having first and second ports, a power pump connected to a fluid source, valve means interposed between said power pump and said first ports and selectively actuatable to supply pressured fluid from said fluid source to actuate one of said fluid motors and to exhaust the other of said motors and means for actuating said valve means, the improvement of said means comprising a reversible pump connected to said steering wheel, conduits connecting said reversible pump to said second ports and opposite ends of said valve means and trapped liquid in said conduits whereby actuation of said reversible pump will (1) actuate said valve means to selectively supply pressured fluid from said power pump to said first ports and (2) transfer fluid between said second ports.

4. A hydraulic steering system as defined in claim 3, in which said fluid motors each comprise a cylinder having a head end and a rod end and a piston and rod slidable in said cylinder with said first ports in communication with said head ends and said second ports in communication with said rod ends.

5. A hydraulic steering system as defined in claim 3, including the further improvement of means maintaining said trapped liquid at superatmospheric pressure.

6. In a hydraulic power steering system including a pair of steering motors each having first and second fluid-receiving ends, a main fluid pressure source, a reservoir, a power pump connected to said source, a steering pump having opposite ends and a control valve having opposite ends and a valve spool movable in opposite directions from a neutral position to selectively supply pressured fluid from said power pump to one of said first fluid-receiving ends while connecting the other of said first fluid-receiving ends to said reservoir, the improvement of means for actuating said control valve comprising a first conduit connecting one end of said steering pump to one of said second fluid-receiving ends and to one end of said control valve and in communication with one end of said valve spool, a second conduit connecting the opposite end of said steering pump to the other of said second fluid-receiving ends and to the opposite end of said control valve and in communication with an opposite end of said valve spool and liquid means in said conduits and isolated from said main fluid source whereby actuation of said steering pump moves said valve spool from the neutral position and transfers said liquid between said second fluid-receiving ends.